Feb. 1, 1955 F. H. FLEISCHMANN 2,701,195
PHOTOGRAPHY REGISTRATION GAUGE
Filed Oct. 26, 1950
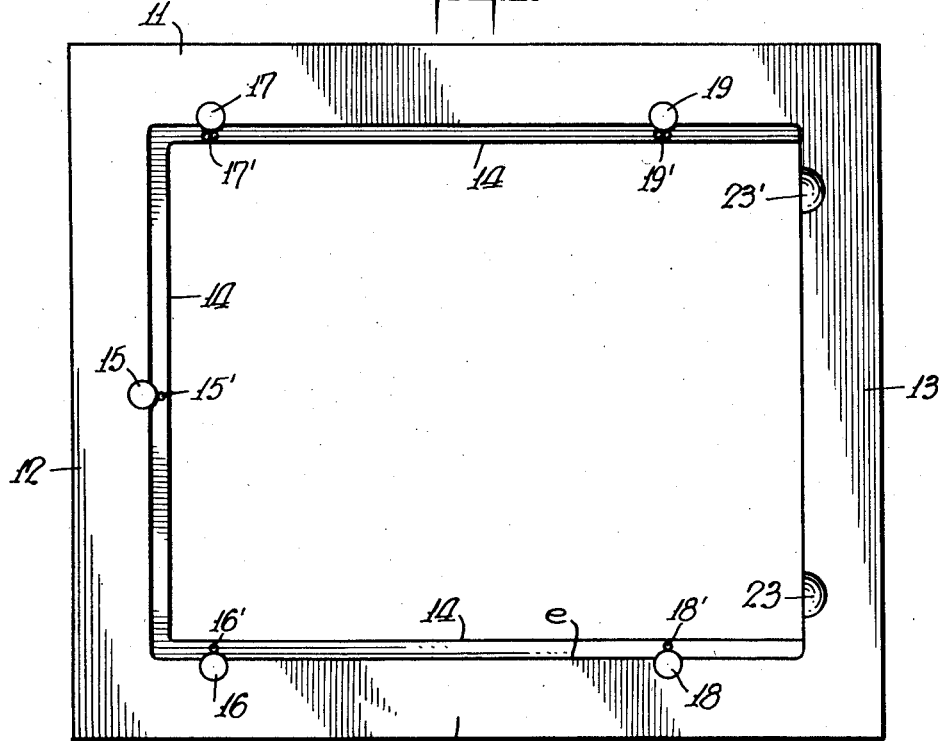
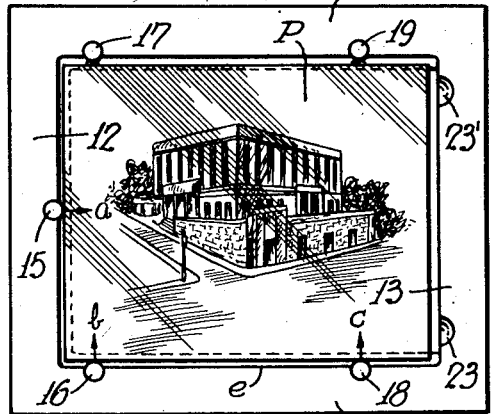
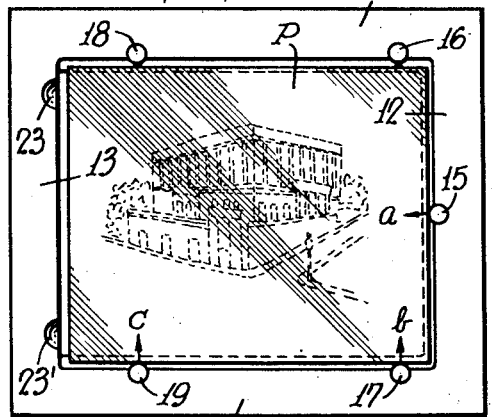
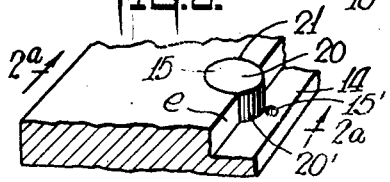
INVENTOR
Frederick H. Fleischmann
BY
Dean Fairbank & Hirsch
ATTORNEYS

United States Patent Office 2,701,195
Patented Feb. 1, 1955

2,701,195
PHOTOGRAPHY REGISTRATION GAUGE

Frederick H. Fleischmann, Brooklyn, N. Y.

Application October 26, 1950, Serial No. 192,211

4 Claims. (Cl. 95—2)

The present invention is concerned with the art of photography and more especially with color photography and the preparation of the numerous negative, positive and auxiliary photographic plates that are required, particularly for a multi-color printing project.

The British physicist, James Clerk Maxwell, predicted in 1855 that color correction would be required for the negatives in color photography in order to obtain true color separation. This prediction proved to be correct since the proportionate reflection and absorption of light from the various colors of a subject, as well as the proportion of transmission through the primary color filters upon a photographic plate, do not correspond to those perceived through the human eye. Vast research has been done over the years in order to attain the desired result, but since the color sensitive photographic plate as such to this day lacks the color discrimination and gradation of shade perceived through the human eye, as well as for other reasons, masking plates are required to effect the needed color correction in order to produce a visually true color separation plate through which the multi-color printing matrices are made in the subtractive color processes.

Considerable adjustment in the selection and considerable manipulation by the arrangement and re-arrangement of various negative, positive and auxiliary photographic plates, including masking plates, are accordingly required in the art of photography, and for each of the numerous settings, it is important that the various plates be disposed in precisely correct position or registry. Since some of the plates must be reversed in this complex photographic art, so that the emulsion bearing face of such plates is outermost with respect to the camera in some operations and innermost in others, such reversal enhances the difficulty of correct registry by heretofore available facilities, bearing in mind that such plates are not manufactured with uniform precision in their edge contours.

One example of the need for such plate reversal is in the correction made necessary by the fact above alluded to that some complementary components of light projected upon the object being photographed will be transmitted through the color filter in addition to the primary color thereof, red, green or blue as the case may be, that alone is intended to reach the emulsion in preparing a negative plate. The masking plate used to correct such error serves to block out the excessive complementary color and simultaneously serves to intensify the primary color gradation on a color separation negative. Such masking plate is commonly prepared by contact printing of a complementary negative or a combination of complementary negatives in registry with a positive of the negative to be corrected. For example a blue negative and a red positive photographed in superposition, afford a mask that blocks out the greens and blues from the red separation. The positive prepared, usually by projection of the original red negative and such masking plate in superposition, will result in a corrected red positive plate with the elimination of the objectionable complementary color as well as improvement in tone gradation where necessary or desired.

Since for contact printing of such mask, the emulsion of of the developed negative should be in direct contact with the emulsion of the masking plate to be prepared, the developed negative must be reversed (front face back) from the position with respect to the plate holder in which it was originally exposed.

Similar reversal is required in preparing by projection the corrected positive plate from the negative and mask plates, since the latter must be shifted so as not to be in position to diffuse and refract the image carrying rays from negative to positive.

Like problems arise in effecting accurate registry of various plates in the course of dropping out, printing in, sur-printing, lining up and photo-composition from as many plates as required, in which operations, among others, various individual plates or combinations of plates are mounted, sometimes with the emulsion at the front side of the plate and sometimes at the back side of the plate as the case may be, and in each case registry must be effected with almost mathematical precision since relative displacement in the order of as little as plus or minus .0003 inch results in a diffused and objectionably outlined image, aside from the noticeably imperfect registry, so that the end product is unsatisfactory.

Where such numerous accurate registrations of plates are to be effected visually with the aid of magnifiers for each of the many operations required in usual practice, the eye strain upon the photographer is an extremely fatiguing ordeal and the operation is time-consuming, while resort to an adjustable angle iron in the camera, regardless how accurately made, will not assure accurate registry, especially in reversal of a plate because of the inevitable inaccuracies in the contours of such plates as made in mass production and because of the wear and tear of the movable parts of such registration device.

Where it is attempted to mitigate these evils by resort to negatives considerably larger and therefore more readily registered visually so that reduced positives can be made for the end product, the contraction in drying of the emulsion of such larger plate is enhanced with consequent bending of the base material with the emulsion, thereby preventing even contact between the negative and mask so that divergencies from accurate registration ensue.

It is accordingly an object of the invention to provide a registration gauge devoid of movable parts, which serves for use in the photographic operations for multi-color as well as black and white printing, and is attachable and removable from a camera front, a camera back, a plate holder, a printing frame or a photo-composing apparatus to serve interchangeably for projection or contact printing, and in all of its uses, assures accurate registry of the negatives, positives, masks and other auxiliary plates whether used singly or in combination, and assures that accuracy without the need for any visual inspection and this regardless whether one or more of the plates are to be used in their normal or in reversed position.

The invention involves an accurately made open rectangular registration gauge frame of suitable metal, with back rests desirably in the form of ledges to support the plate or plates therein, and edge rests presenting contact points, one in the middle of a lateral beam, one in each of the upper and lower beams at equal distances from the contact point of the lateral beam and another pair of edge contact points in such upper and lower beams nearer the other lateral beam and also at equal distances from the lateral contact point. Thus the plate or plates will rest by gravity upon the two points in the lower beam and can be manually slid laterally for engagement of a lateral edge of the plate with the edge contact point in the lateral beam. Thus the edge of the photographic plate will be engaged at three points when in the frame, two on the lower edge and one on a lateral edge. The gauge will therefore permit precise registry of the various plates thus inserted and will admit of equally precise registry even when one or more of the plates is turned over or reversed in the course of various operations. For such reversal, the frame need merely be turned so that the upper beam becomes the lower beam and the lateral beam with the edge rest point is accordingly at the right rather than the left. With the plate thus reversed, it is manifest that exactly the same three points of the plate that had rested on the gauge in upright position will now rest on three edge contact points of the gauge in inverted position, regardless whether the plate be introduced in normal or in reversed position.

In the accompanying drawings in which is shown one of various possible embodiments of the several features of the invention, Fig. 1 is a plan view of the registration gauge frame, Fig. 2 is a perspective view of a fragment of the frame adjacent one of the edge contact points, Fig. 2ᵃ is a view in longitudinal cross section taken on line 2ᵃ—2ᵃ of Fig. 2, Fig. 3 is a view on a smaller scale illustratively showing a plate in position therein, and Fig. 4 is a view similar to Fig. 3 showing the manner of holding the plate in reversed position in the gauge frame.

Referring now to the drawings, the registration gauge is desirably an open rectangular frame, presenting a lower beam 10, an upper beam 11 parallel thereto, and a left beam 12 and a right beam 13, both at right angles to the horizontal beams. For accuracy and durability, yet lightness in construction, this frame is desirably machined as an integral unitary structure from suitable alloy of aluminum or of magnesium, and is desirably of thickness of the order of one-half inch for adequate massiveness and stiffness to afford assurance against bending or other deformation. The frame is desirably suitably plated, anodized, painted or lacquered for protection against corrosion and for substantially eliminating light reflection. The opening of the frame is desirably of height but slightly greater than the height of the photographic plates that it is to accommodate and is of length of the order of one quarter inch greater than the length of such plates.

Desirably the frame is made unitary with a back rest for the plates to be accommodated therein, each back rest comprising a ledge 14 which is preferably an integral part of the frame and extends inward from the inner edge of the upper, the lower and the left beam and is desirably flush with the lower face of the gauge frame, protruding inward therefrom for a distance in the order of three-eighths inch, such back rest presenting a web of metal of thickness much less than that of the frame as shown, in order to accommodate the thicknesses of the plate or of various plates that are to be accommodated in the frame in each of the multifarious steps in which it is used in the photographic process.

While short back rest segments could be used, it is preferred as shown to provide back rest ledges 14 that extend substantially the entire length of the lower beam 10, the entire length of the upper beam 11 and the entire length of at least one of the lateral beams 12.

The frame is equipped with edge stops for the plates, each edge stop affording substantially point engagement with the plate or plates accommodated in the frame, for which purpose each edge stop extends at right angles to the plane of the frame through the thickness thereof from the corresponding back rest 14 to the face of the frame. The edge stops comprise one lateral edge stop 15 at the middle of one of the lateral beams 12 and two like stops 16 and 17 on the lower and upper beams 10 and 11, respectively, near lateral beam 12, but at equal distances from the lateral edge stop 15 and also two further like edge stops 18 and 19, one in the lower beam and one in the upper beam, nearer the other lateral beam 13 and also at equal distances from the same edge stop 15.

Each of the edge stops is of material much harder and more wear-resistant than that of the frame, since it must support and resist frictional contact with the edges of hard glass plates. Preferably each edge stop is of hardened steel, and is securely keyed into the frame for permanent incorporation immovably therewith.

In the construction shown, each edge stop is in the form of a cylinder 20, preferably a solid cylinder of hardened steel which is permanently keyed into the corresponding beam of the frame with its axis at right angles to the plane of the ledge, by providing in said frame an arcuate keying notch 21 of peripheral extent, snugly to engage more than half the periphery of the cylindrical edge stop 20, or of depth greater than the radius of the cylinder, as shown. The cylinder is preferably of length equal to the thickness of the frame and its rear end is lodged in a corresponding circular opening 22 within the beam and the back rest ledge 14 thereof. Forward of said back rest ledge 14, a segment 20' of the cylindrical periphery of the edge stop is exposed inward of the inner edge e of the corresponding beam and such exposed segment extends from the face of the back rest ledge 14 to the face of the frame. Each of the edge stops is accurately and precisely positioned in the frame so that the center of cylinder 15 is substantially precisely midway between the ends of the lateral beam 12, the centers of edge stops 16 and 17 are at substantially precisely equal distances from the center of edge stop 15 and the same is true with respect to the distances of cylinders 18 and 19 from the center of said edge stop 15.

As shown illustratively in Fig. 3, when a photographic plate P is rested in the upright gauge frame of the invention against the back rest ledge 14, its lower edge will rest by gravity upon the edge stops or rests 16 and 18 and by introducing the finger into either finger notch 23 or 23' in the outer face of the lateral beam 13, the plate is readily slid to position with its left edge engaging the lateral edge stop 15. As is evident, if the frame be tilted in its vertical plane so that its lower beam is inclined with its lower end at the beam 12 that carries edge rest stop 15, the plate could be automatically positioned by gravity against all three stops 15, 16 and 18, without the need for manual shifting operation through notch 23 or 23'. Thus the position of the plate P is accurately determined by engagement with three edge stops 15, 16 and 18, respectively, at three definite points of the plate indicated at a, b and c. By reason of the precision of the registry gauge frame shown, any number of photographic plates will be accuratley positioned in superposed relation for engagement of three definite points on the edges of the plates with the three edge stops referred to. Preferably, conventional spring arms (not shown) hinged to the lateral beams are turned inward to press the plates against ledges 14, thereby to keep them from falling out of the upright frame.

In Fig. 4 is indicated the mode of use when one or more of the photographic plates P is to be reversed (front side back) for any of the purposes above indicated. Comparing Fig. 4 with Fig. 3, it is seen that the gauge frame has been turned around in its own plane so that the upper beam 11 has now become the lower beam and the left beam 12 has now become the right beam. When the same plate P shown in Fig. 3 is placed in reverse relation into the frame that had been turned to the position shown in Fig. 4, so that its emulsion side is on the face opposite that shown in Fig. 3, the plate now rests by gravity upon the edge rests or stops 17 and 19 in the now lower beam 11 and when slid by finger engagement through either finger notch 23' or 23 (now at the left), its now right edge engages the lateral edge stop 15 of the frame which is now at the right. Therefore, identically the same three points a, b and c on the edges of the plate that engaged three edge rests in Fig. 3, still engage three edge rests in Fig. 4, so that accuracy of registry is assured. Thus the now reversed plate is positioned in Fig. 4 in the same precisely accurate position as it was in Fig. 3, although it had been reversed and any other plates also mounted in the gauge frame in Fig. 4 with or without reversal (front to back) will necessarily be engaged by the same three edge stops at the corresponding three points of such plates so that misalignment or inaccuracy of registry is absolutely precluded.

Thus by the present invention, assurance is had that in each and every stage of every manipulation with any of the multifarious negative, positive, masking or other auxiliary plates, the same three points of each plate engage the single lateral edge stop and the two edge stops or rests on the beam therebelow, at each stage and these three points being in the accurately made gauge frame thereof are in identical position whether the frame is used in the position shown in Fig. 3 or in that shown in Fig. 4. Even though many of the operations are performed in the dark room, precise registry of the plates is at all times assured by manipulation in the dark, not only without eye strain but without any visual effort.

If desired, the registration gauge may automatically imprint upon the border of each photographic plate a small mark that indicates the exact points at which it engages the three edge stops, thereby further to facilitate the various settings of the plates in carrying out the photographic process.

To this end, all that is required is to provide a small perforation 16', in the order of one-sixteenth to one-eighth inch diameter through the ledge 14 adjacent the support point of the edge contact stop 16. A similar hole 18' is provided adjacent edge stop 18 and a like hole 15' adjacent lateral edge stop 15. Manifestly small spots corresponding to the holes 16', 18' and 15' will become imprinted upon the negative plate thus formed by the bright light passing through the respective holes and the impression of these spots will appear on all positive, masking or other plates imprinted from the negative, thereby to aid, as is obvious, in the various settings of plates above set forth.

Small holes are also preferably provided in the ledge 14 adjacent the edge stops 17 and 19 on the upper beam, but these holes are preferably of shape, form or arrangement such as to be readily discriminated from those corresponding to the other edge stops. Illustratively the holes in the upper beam are of the same size as those in the lower beam, but desirably in contiguous tangential pairs defining a reclining figure eight with the point of tangency between the two holes identified as 17′ and 19′, respectively, aligned with the support point of the corresponding edge stops 17 and 19.

Since the height of the photographic plate is somewhat less than the height of the opening of the frame, the holes 17′ and 19′ will not photograph upon the plate in the setting of Fig. 3, while in the reverse setting of Fig. 4, these holes 17′ and 19′ will register upon the plate, but those of holes 16′ and 18′ will not so register.

Accordingly, depending on the shape of the holes photographed upon the plate, each negative and its derivative plates will inherently show whether it was printed in one or the other setting of the frame which information may be helpful in effecting the required registrations for performing the various photographic operations.

Where a gauge of the character described is used in the plate holder to accommodate the plates from which the positives are to be made and an identical such gauge retains the corresponding negatives, any number of such plates are exchangeable and interchangeable as often as is necessary and desired and all finished positives will have the same three points of contact with respect to the registration gauge and will therefore necessarily be accurately registered with each other and with respect to the negative and auxiliary plates from which they had been prepared. Subsequent registration, masking, dropping out, printing in, sur-printing, lining up and photo composition can be accomplished with the aid of the registration gauge of the present invention with the total elimination of the time-consuming and fatiguing visual registration and with versatility heretofore unattainable in the art of color photography.

With the use of one or more of the registration gauges of the present invention, a process camera, projector, enlarger, printing frame or composing machine thus becomes a precision instrumentality admitting of withdrawal and replacement of negative, positive or auxiliary plates or interchange thereof as often as desired with assurance of precise registry in all cases.

Of course the gauge could be mounted in a movable holder of various known types for change in the position of the gauge holding the plate or plates, so as to adjust the position thereof horizontally, vertically or in an arc without in any wise detracting from the interchangeability of such plates.

Manifestly the registration gauge could be embodied in duplex or multiplex form and when placed in the illuminated part of the photographic device, will render possible the photographing of two or more subjects at one time without sacrificing any of the advantages of the single registration gauge set forth.

The registration gauge frame of the present invention admits of use even for small photographic plates or sections of larger plates, with assurance of sufficient accuracy in registry to permit of considerable enlargement from the same.

While the registration frame shown and described could could be used for checking registration of various plates, negative, positive and masks, by projecting light through the superposed plates resting in the frame, which in turn is positioned on a luminous ground glass platform or table, such checking can be more conveniently performed by using a frame devoid of the ledge 14 so that the lowermost photographic plate rests directly upon the luminous table and for such checking purposes, it would be manifestly sufficient to provide a frame in the form of an angle iron with only the three edge rests 16, 18 and 15.

As many changes could be made in the above equipment, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. In the art of photography, a registration gauge comprising a rectangular frame of metal comprising a lower beam, an upper beam and connecting lateral beams, said frame having integral therewith back rests for the plates to be positioned therein, said back rests comprising ledges extending inward from the lower faces of the respective beams and of thickness materially less than the thickness of the frame, edge stops for such plates, each of said edge stops comprising a cylinder of hardened steel rigidly assembled with the frame as a unitary part thereof with its axis at right angles to the plane of the frame, each of said cylinders being of height substantially equal to the thickness of the frame and extending through a circular aperture in the corresponding back rest and through a corresponding cylindrical notch in said frame, of depth greater than the radius of said cylinder so that a part of the cylinder extends into the opening of the frame beyond the inner edge of the corresponding beam and forward from the associated back rest, one of said edge rests being thus positioned midway between the ends of one of the lateral beams, a pair of said edge stops being disposed respectively in the lower and upper beam and equidistant from said lateral edge stop, and another pair of said edge stops being disposed respectively in the lower and the upper beam and also equidistant from said lateral edge stop, but more remote therefrom than the companion pair of said stops.

2. In the art of photography, a registration gauge comprising a rectangular frame of a unitary piece of solid metal comprising a lower beam, an upper beam and connecting lateral beams, said frame having integral therewith back rests for the plates to be positioned therein, said back rests comprising ledges extending inward from the lower faces of the respective beams and of thickness materially less than the thickness of the frame, edge stops each comprising a solid cylinder of hardened tool steel rigidly assembled with the frame as a unitary part thereof with its axis at right angles to the plane of the frame, each of said cylinders being keyed into a corresponding cylindrical notch of arcuate extent greater than a semicylinder and extending through a corresponding circular aperture in the corresponding back ledge and frame so that a part of the cylinder extends into the opening of the frame beyond the inner edge of the corresponding beam and forward from the associated back rest, one of said edge stops being thus positioned midway between the ends of one of the lateral beams, a pair of such edge stops being disposed respectively in the lower and upper beam relatively nearer but equidistant from the middle of said lateral edge stop, and another pair of said edge stops being disposed respectively in the lower and the upper beam relatively farther but equidistant from the middle of said lateral edge stop.

3. The combination recited in claim 2 in which each back rest ledge extends substantially the full length of the corresponding edge stop carrying beam.

4. In the art of photography, a registration gauge comprising a unitary piece including a lower beam and a lateral beam rising therefrom, and a plurality of plate edge stops rigidly mounted in the frame and including a lateral edge stop protruding laterally inward from said lateral beam, and a pair of edge stops rigid with and protruding inward from the lower beam, each of said edge stops comprising a cylinder of hardened steel rigidly assembled with the frame as a unitary part thereof with its axis at right angles to the plane of the frame, each of said cylinders being of height substantially equal to the thickness of the frame and extending through a circular aperture in the corresponding back rest and through a corresponding cylindrical notch in said frame, of depth greater than the radius of said cylinder so that a part of the cylinder extends into the opening of the frame beyond the inner edge of the corresponding beam and forward from the associated back rest.

References Cited in the file of this patent

UNITED STATES PATENTS

| 2,071,010 | Weberling | Feb. 16, 1937 |
| 2,151,429 | Klopp | Mar. 21, 1939 |

FOREIGN PATENTS

| 189,844 | Great Britain | Dec. 11, 1922 |